Oct. 11, 1927.
J. S. HARDIMAN
1,644,999
ARTICLE ARRANGING DEVICE
Filed May 12, 1925    2 Sheets-Sheet 2
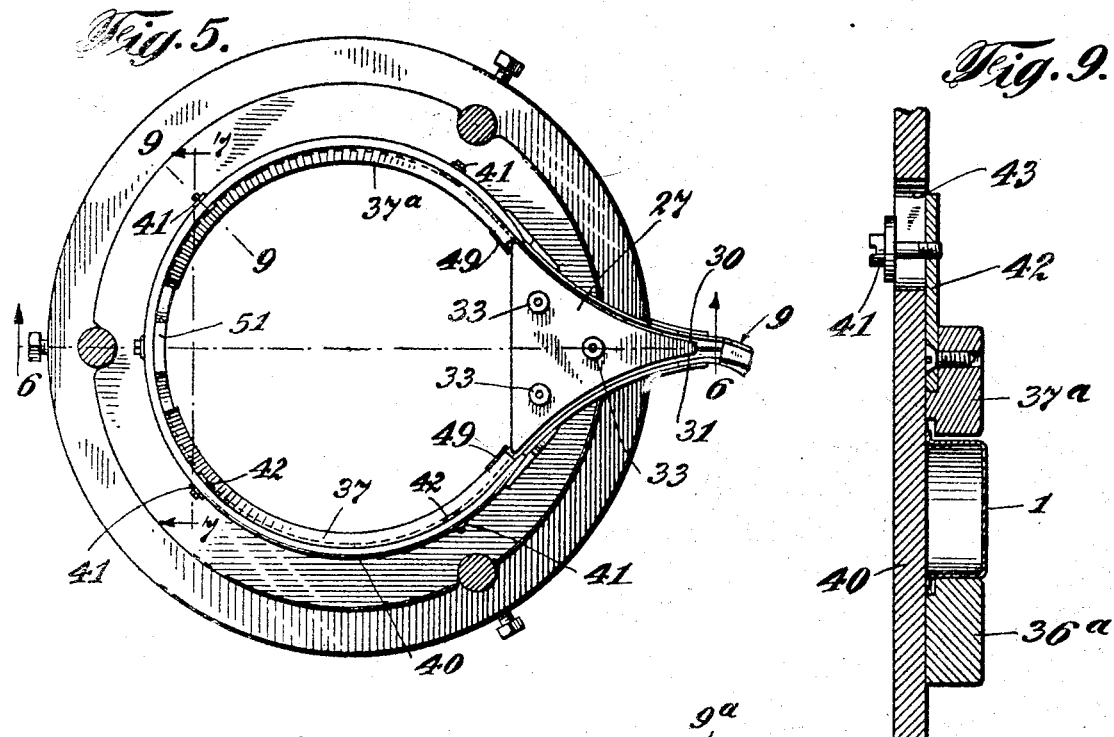
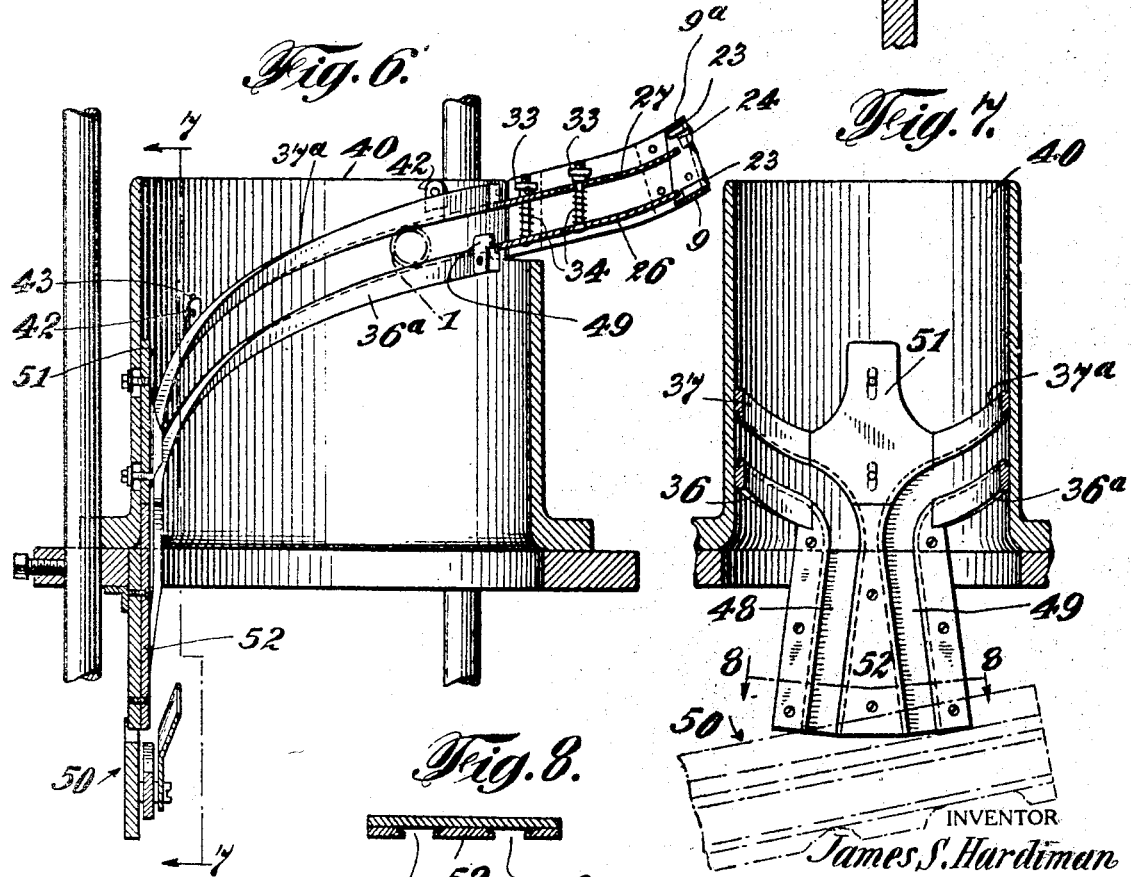
INVENTOR
James S. Hardiman
BY
George Ranney
his ATTORNEY Patented Oct. 11, 1927.

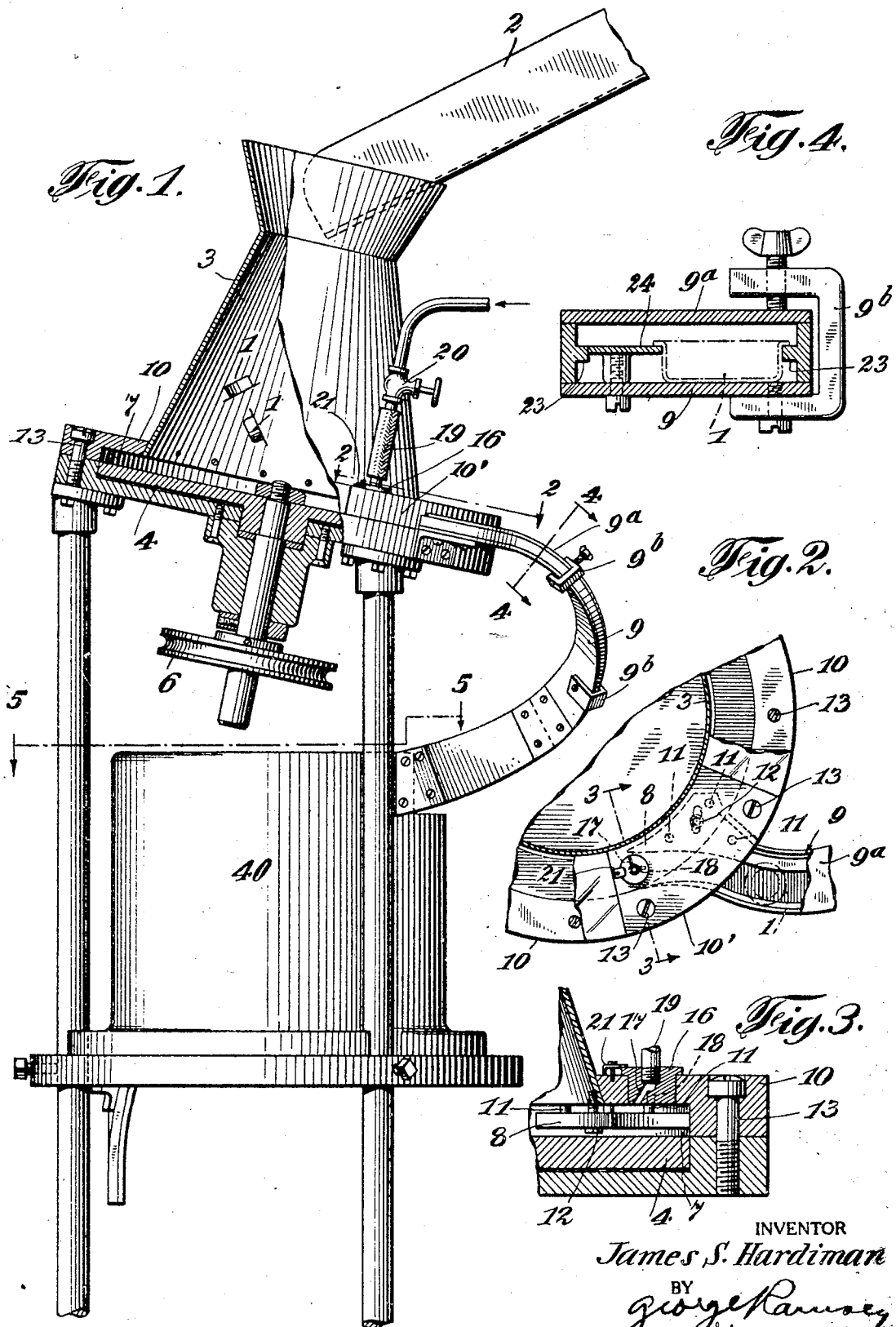

1,644,999

UNITED STATES PATENT OFFICE.

JAMES S. HARDIMAN, OF LONG ISLAND CITY, NEW YORK, ASSIGNOR TO ANCHOR CAP AND CLOSURE CORPORATION, OF LONG ISLAND CITY, NEW YORK, A CORPORATION OF NEW YORK.

ARTICLE-ARRANGING DEVICE.

Application filed May 12, 1925. Serial No. 29,802.

The invention relates to devices for arranging articles and particularly to a device especially adapted for orienting and arranging blanks or the like which are used in the manufacture of sheet metal caps.

An object of the invention is to provide a device for arranging articles which incorporates elements that are adjustable to adapt the device for handling articles of different sizes.

Another object of the invention is to eliminate clogging and jamming in an apparatus for receiving articles in bulk and arranging them.

A further object of the invention is to provide a simple, reliable apparatus for orienting and arranging caps, cap blanks, or similar articles received in bulk.

A still further object of the invention is to provide an apparatus for arranging articles which permits ready access to the articles at all points of their path through the apparatus.

Other objects of the invention will be apparent from the accompanying disclosure.

The invention is disclosed in the form of an apparatus for orienting and arranging blanks consisting of a hollow cylinder closed at one end and attached at the other end to an outwardly extending annular flange. The blanks to be arranged are discharged in bulk into a hopper that holds the mass of blanks in contact with a rotating disc, which carries a number of the blanks through a circular path. Projecting over a zone adjacent the edge of the rotating disc is a guiding member which intercepts the blanks one after another, as they are carried around by the disc, and guides them into a main chute. It is obvious that an individual blank may occupy either one of two positions in the main chute, viz, the flange of the blank may be adjacent one side of the chute or it may be adjacent the opposite side.

Suitably located, as beneath the rotating disc, is a hollow cylinder on the interior surface of which two branch chutes are formed by rail members attached to the cylindrical surface. Each of these branch chutes is helical and traverses less than a semi-circumference of the cylinder, one branch chute extending in a clockwise direction, about the cylinder and the other extending in a counter-clockwise direction. The main chute conveys blanks in both of the two positions to a point adjacent the cylinder, where guiding means in the form of a switch guides the blanks that are in one position into one branch chute and the blanks which are in the other position into the other branch chute. Due to the arcuate paths in the branch chutes, each of the blanks as it passes through a branch chute is rotated, in effect, through an angle of 90° about a line lying in the plane of the flange of the blank; and since one of the chutes rotates the blanks in one direction and the other rotates the blanks in the opposite direction, all of the blanks are in the same position when they arrive at the ends of the two branch chutes. From the ends of the branch chutes, the blanks may pass into a "carry-off" chute where they all lie in the same position. The "carry-off" chute may convey the blanks to spinning machinery or any other desired operating mechanism.

Fig. 1 of the drawings is an elevational view partially in section illustrating the present invention.

Fig. 2 is a detail sectional view taken on the line 2—2 of Fig. 1.

Fig. 3 is a detail sectional view taken on the line 3—3 of Fig. 2, showing the guiding means for removing the articles from the rotating disc and air blast means for agitating the articles at this point.

Fig. 4 is a cross-sectional view of the main chute taken on the line 4—4 of Fig. 1.

Fig. 5 is a cross-sectional view taken on the line 5—5 of Fig. 1 and showing the hollow cylinder on the surface of which are mounted the two branch chutes.

Fig. 6 is a fragmentary sectional view taken on the line 6—6 of Fig. 5, showing the interior surface of the cylinder and one of the branch chutes.

Fig. 7 is a fragmentary sectional view on the line 7—7 of Figs. 5 and 6 showing the discharge end of the two branch chutes.

Fig. 8 is a sectional view on the line 8—8 of Fig. 7.

Fig. 9 is a fragmentary sectional view on the line 9—9 of Fig. 5 showing the hollow cylinder and the rail members which form one of the branch chutes on its interior surface.

Referring to Fig. 1, a mass of hat-shaped blanks 1 is discharged from a chute 2 into a hopper 3 which holds the mass of blanks in contact with a disc 4 suitably mounted and adapted to be rotated by means of a belt (not shown) which actuates pulley 6. As the disc rotates blanks are thrown by centrifugal force into annular recess 7 and are carried around by the disc. Projecting over the edge of the disc is a guide member 8 (Figs. 2 and 3) which intercepts blanks, one after another, and guides them into a main chute 9. As shown in Fig. 1 the disc 4 is so inclined to the horizontal that gravity aids the movement of the blanks at the point where they are intercepted by guide member 8 and directed to chute 9.

The guide member 8 consists of a more or less triangular plate of metal which is spaced, by spacers 11, from section 10' of an annular ring 10 that surrounds the base of the hopper 3. The guide member 8 is fastened to section 10' by a screw 12 that passes through a slot in the guide member, which permits the guide member to be shifted in position to adapt it to intercept different sizes of caps. The section 10' of the annular ring 10 is removable and is held in place by screws 13.

Associated with removable section 10' is an air blast device consisting of a plug 16 traversed by air passages 17 and 18 to which air is supplied through flexible coupling 19 connected with a suitable air valve 20. The air passing through passages 17 and 18 serves to more or less agitate the caps at the point where they are intercepted by a guiding member 8, for the purpose of preventing clogging and placing them in suitable position for entrance into the chute. The plug 16 may be turned so that the passages 17 and 18 point in any desired direction, but preferably the plug is clamped by means of clamp 21 so that one air passage points radially inward of the disc and the other points down the chute as shown in Fig. 2. This arrangement is particularly advantageous for the reason that the discharge of air from the passage pointing down the chutes aids the movement of the caps; and air from the passage which points radially inward is effective to separate the caps in case one cap lies partially on top of another, or to blow away small fragments of scrap which sometimes enter with the caps.

The main chute 9 is provided with tongues 23 adapted to cooperate with the flanges of the hat-shaped blanks, which may lie either in the position indicated in dotted lines in Fig. 4, or in the reverse of that position. As shown, the chute 9 is provided with a removable strip 24 which may be replaced by strips of different widths, or be removed altogether, to adapt the chute for conveying blanks of different diameters.

The caps are conveyed by the main chute 9 to the switching device shown in Figs. 5 and 6 which separates the caps lying in one position from those lying in the other position. This switching device consists essentially of a pair of similar more or less triangular plates 26 and 27 which are superimposed and are spaced apart a distance equal to the diameter of the cylindrical portion of the blanks. The flanges of blanks which are in one position in chute 9 strike the edge 30 (Fig. 5) of the nose of each switch plate, which acts as a switch tongue, and directs those blanks into one of the branch chutes. The flanges of blanks which are in the other position in chute 9 strike the edge 31 of the nose of each switch plate, which guides those blanks into the other of the branch chutes. As shown in Fig. 6, the switch plate 26 is fixed in position and the switch plate 27 is adjustable relative thereto by means of nuts 33 and springs 34, thus adapting this switching mechanism to handle blanks of different diameters.

The branch chutes are formed by pairs of spiral rail members 36 and 37, and 36ª and 37ª (Figs. 5, 6, 7 and 9), which are affixed to the interior of the hollow cylinder 40. The lower rail members 36 and 36ª are fixed in position, and the upper rail members 37 and 37ª are vertically movable. Movement of rail members 37 and 37ª is readily effected since these rails are held in place by screws 41 which pass through slots 43 in cylinder 40 and are threaded into ears 42 which are fastened to the rails 37 and 37ª. This movability of the upper rail members enables the branch chutes to be adjusted to accommodate blanks of different diameters. At the points where the blanks enter the branch chutes sheet metal guides 49 (Figs. 5 and 6) may be provided to engage the cover portions of the blanks and aid in guiding them into the branch chutes.

Blanks entering the branch chute comprising rail member 37 are conveyed about an arc of cylinder 40, passing in a clockwise direction, while those entering the branch chute comprising rail member 37ª are conveyed about an arc, passing in a counter-clockwise direction. By means of this arrangement of the branch chutes, the blanks arrive at the discharge ends of these chutes with all flanges in the same position. As shown more especially in Figs. 6 and 7, the blanks pass from the branch chutes into vertical ways 48 and 49 which direct them into a "carry-off" chute, denoted in general by 50, by which they may be conveyed to a spinning machine or any other mechanism to be operated upon.

To adapt the ways 48 and 49 to handle different diameters of caps, the member 51 which forms part of the ways may be vertically adjustable as shown in Figs. 6 and 7, and the member 52 is removable and may be replaced by another one of different width.

It is seen that the ring section 10' which carries the guide member 8 and the air blast plug 16 is readily removable and thus access may be had to the blanks at the point where they are guided from the rotating disc into the chute, to enable the operator to relieve any jams which may occur due to unusual conditions. Furthermore, the main chute 9 is formed with a removable cover 9ª held in place by clamps 9ᵇ as shown in Figs. 1 and 4, and thus access may be readily had to this chute. The branch chutes being formed by rail members are readily accessible; and thus it is seen that the mechanism is so constructed that access may be had to the blanks at any point, to relieve any jam which may occur due to deformed blanks or other causes.

It is realized that the present invention may be adapted to handling articles other than flanged blanks and may be embodied in forms other than the one particularly disclosed and hence it is desired the disclosure be considered as illustrative and not be considered as limiting.

Having thus described my invention, what I claim is:—

1. In a device of the class described; a main chute for conveying articles which may assume two positions therein; a pair of branch chutes arranged to receive articles from the main chute; and means to divert articles that are in one position into one of said branch chutes and articles that are in the other position into the other of said branch chutes, said diverting means being adjustable to accommodate different sizes of articles.

2. In a device of the class described; a main chute for conveying articles which may assume two positions therein; a pair of branch chutes arranged to receive articles from the main chute; and means to divert articles that are in one position into one of said branch chutes and articles that are in the other position into the other of said branch chutes, said diverting means and said branch chutes being adjustable to accommodate different sizes of articles.

3. In a device of the class described; a hollow cylinder; and a pair of rail members located adjacent the surface of the cylinder to form therewith a chute, at least one of said rail members being adjustable to adapt the chute to handle articles of different sizes.

4. In a device of the class described; a hollow cylinder, a pair of rail members attached to the inner surface of the cylinder to convey articles in a clockwise direction with respect to the cylindrical surface, and a second pair of rail members attached to the inner surface of the cylinder to convey articles in a counter-clockwise direction with respect to the cylindrical surface whereby said articles are permitted to roll edgewise throughout the orienting operation.

5. In a device for arranging articles; a hollow cylinder, a pair of spiral rail members attached to the inner surface of the cylinder to convey articles in a clockwise direction with respect to the cylindrical surface for approximately a semi-circumference of said cylinder, a second pair of spiral rail members attached to the inner surface of the cylinder to convey articles in a counter-clockwise direction with respect to the cylindrical surface for approximately a semi-circumference of said cylinder, and a chute positioned to receive articles conveyed by each of said pairs of rail members.

6. In a device for arranging articles, a main chute adapted to convey articles which may assume two positions therein; a hollow cylinder; a pair of spiral rail members attached to the inner surface of the cylinder to convey articles in a clockwise direction for approximately a semi-circumference of said cylinder; a second pair of spiral rail members attached to the inner surface of the cylinder to convey articles in a counter-clockwise direction for approximately a semi-circumference of said cylinder; and means to divert articles from the main chute to the pairs of spiral rail members, said means being operative to divert articles in one position to one pair of rail members and articles in the other position to the other pair of rail members.

7. In a device for handling articles; a substantially flat rotating disc, a hopper for receiving the articles and holding them in contact with said disc, an article conveying chute positioned to receiving articles from the disc, and means to discharge a stream of fluid under pressure near the entrance of the chute.

8. In a device for handling articles, a hopper, a chute positioned to receive articles from the hopper, and means to deliver a blast of air near the entrance to the chute, said means being movable to shift the direction of the air blast.

9. In a device of the class described, a rotating disc adapted to carry a plurality of articles, guiding means projecting over said disc to withdraw articles from the disc one at a time, and means to discharge a fluid under pressure adjacent the point where articles are engaged by the guiding means, said fluid agitating said articles and assisting in aligning them.

10. In a device of the class described, a rotating disc adapted to carry a plurality of articles, means forming a passageway to receive articles from the disc and means to discharge a blast of air toward the center of the disc at the entrance to the passageway.

11. In a device for handling articles, a hollow cylinder, a pair of rail members secured to the inner surface of the cylinder to form therewith a skeleton chute for permiting articles to roll edgewise therein with their top portions exposed to view, means to deliver articles to a point adjacent the entrance end of the chute, and guide means at the entrance to the chute, said guide means being adapted to engage the top portion of the articles and thereby assist in directing them into the chute.

12. In a device of the class described the combination of a hollow cylinder, a guideway attached to the inner surface of the cylinder to convey articles with respect to the cylindrical surface throughout substantially a semi-circumference of said cylinder, and a second guideway attached to the inner surface of the cylinder to convey articles with respect thereto throughout substantially a semi-circumference of said cylinder, whereby said articles are oriented while rolling edgewise along said guideways.

13. In a device for handling articles, a hopper, a chute positioned to receive articles from the hopper, and means to deliver blasts of air in different directions near the entrance to the chute, one of said blasts being adapted to agitate the articles at a point adjacent the entrance, and another of said blasts being adapted to expedite the movement of the articles along the chute.

14. In a device for handling articles, a hopper, a chute positioned to receive articles from the hopper, means to deliver blasts of air in different directions near the entrance to the chute, one of said blasts being adapted to agitate said articles at a point adjacent the entrance, and devices for changing the directions of said blasts to secure maximum agitation.

JAMES S. HARDIMAN.